US010887423B2

(12) United States Patent
Somech et al.

(10) Patent No.: US 10,887,423 B2
(45) Date of Patent: Jan. 5, 2021

(54) PERSONALIZATION OF VIRTUAL ASSISTANT SKILLS BASED ON USER PROFILE INFORMATION

(71) Applicant: Microsoft Technology Licensing, LLC, Redmond, WA (US)

(72) Inventors: Haim Somech, Ramat Gan (IL); Adi L. Miller, Ramat Hasharon (IL); Adi Gerzi, Hod Hashron (IL); Itamar Barkai, Givar Brener (IL); Faith Y. Xu, San Francisco, CA (US); Omri Gutman, Kefar Sava (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 15/622,742

(22) Filed: Jun. 14, 2017

(65) Prior Publication Data

US 2018/0332169 A1    Nov. 15, 2018

Related U.S. Application Data

(60) Provisional application No. 62/503,590, filed on May 9, 2017.

(51) Int. Cl.
*G10L 15/18* (2013.01)
*H04L 29/08* (2006.01)
(Continued)

(52) U.S. Cl.
CPC ............ *H04L 67/306* (2013.01); *G06F 3/048* (2013.01); *G06Q 10/10* (2013.01); *H04L 67/26* (2013.01);
(Continued)

(58) Field of Classification Search
CPC ........... G06Q 30/0641; G06Q 30/0645; G06Q 10/02; G06Q 30/00; G06Q 50/01;
(Continued)

(56) References Cited

U.S. PATENT DOCUMENTS 8,346,563 B1 *   1/2013   Hjelm ................. G10L 15/1822
                                                      379/88.01
9,172,747 B2   10/2015   Walters et al.
(Continued)

OTHER PUBLICATIONS

"Cortana to open up to new devices and developers with Cortana Skills Kit and Cortana Devices SDK", https://blogs.windows.com/buildingapps/2016/12/13/cortana-skills-kit-cortana-devices-sdk-announcement/, Published on: Dec. 13, 2016, 4 pages.
(Continued)

*Primary Examiner* — Ahmad F. Matar
*Assistant Examiner* — Kharye Pope
(74) *Attorney, Agent, or Firm* — Medley, Behrens & Lewis, LLC (57) ABSTRACT

Disclosed in some examples are methods, systems, machine-readable media, and devices to provide a personalized experience, by making user data available to a skill in a personal assistant service. In an example, a third-party skill such as an automated bot may obtain user data (such as user profile and contextual information at runtime) to personalize and adjust an interaction to the user. Operations to implement the techniques may include: providing a data interface of the personal assistant service to expose user data maintained by the personal assistant service, based on user data privacy settings and third-party skill permissions; receiving a request from the third-party skill, via the data interface, to obtain the user data to in connection with performing some action of the third-party skill; and providing the user data to the third-party skill in response to the request, based on the permission settings and the privacy settings.

20 Claims, 5 Drawing Sheets

(51) Int. Cl.
*G06F 3/048* (2013.01)
*G06Q 10/10* (2012.01)
*H04M 3/527* (2006.01)
*H04M 3/493* (2006.01)
G06F 17/00 (2019.01)
H04M 1/00 (2006.01)

(52) U.S. Cl.
CPC .......... *H04M 3/527* (2013.01); *H04M 3/4936* (2013.01); *H04M 2203/2072* (2013.01); *H04M 2250/74* (2013.01)

(58) Field of Classification Search
CPC .... G06Q 30/0613; G06Q 20/12; G06Q 20/18; G06F 17/30864; G06F 21/32; G06F 3/167; G06F 17/28; G06F 9/451; G06F 3/0637; G06F 17/30684; H04L 67/306; H04L 67/10; H04L 63/102; H04L 51/02; H04L 67/26; H04L 63/0861; G10L 2015/223; G10L 15/005; G10L 15/22; G10L 15/265; H04M 1/6041; H04M 1/72522; H04M 1/6033; H04M 1/72527; H04M 1/72561; H04M 1/72569; H04M 1/72572; H04M 2201/40; H04M 2203/2072; H04M 3/42348
USPC ...................... 705/26.43, 26.41, 14.51, 27.1; 455/569.1; 704/275
See application file for complete search history.

(56) References Cited

U.S. PATENT DOCUMENTS

| | | | | |
|---|---|---|---|---|
| 9,424,840 | B1* | 8/2016 | Hart | G10L 15/22 |
| 9,940,930 | B1* | 4/2018 | Campbell | G10L 15/22 |
| 2002/0118223 | A1 | 8/2002 | Steichen et al. | |
| 2008/0071547 | A1* | 3/2008 | Prieto | B60N 2/002 |
| | | | | 704/275 |
| 2008/0091432 | A1* | 4/2008 | Dalton | G10L 15/26 |
| | | | | 704/275 |
| 2012/0084348 | A1* | 4/2012 | Lee | G06Q 30/02 |
| | | | | 709/203 |
| 2012/0245944 | A1* | 9/2012 | Gruber | G06F 17/3087 |
| | | | | 704/270.1 |
| 2013/0205135 | A1* | 8/2013 | Lutz | G06F 21/6245 |
| | | | | 713/165 |
| 2013/0297551 | A1* | 11/2013 | Smith | G06N 5/02 |
| | | | | 706/48 |
| 2013/0332168 | A1* | 12/2013 | Kim | G10L 15/22 |
| | | | | 704/251 |
| 2014/0201120 | A1* | 7/2014 | Lydon | G06F 21/316 |
| | | | | 706/46 |
| 2014/0244712 | A1* | 8/2014 | Walters | H04L 67/10 |
| | | | | 709/202 |
| 2015/0169336 | A1* | 6/2015 | Harper | G10L 15/22 |
| | | | | 715/706 |
| 2015/0185996 | A1* | 7/2015 | Brown | G06F 3/04817 |
| | | | | 715/706 |
| 2015/0278348 | A1 | 10/2015 | Paruchuri et al. | |
| 2015/0279366 | A1* | 10/2015 | Krestnikov | H04W 4/70 |
| | | | | 704/235 |
| 2016/0342665 | A1 | 11/2016 | Lane et al. | |
| 2017/0041373 | A1* | 2/2017 | Tal | H04L 51/24 |
| 2018/0233142 | A1* | 8/2018 | Koishida | G06K 9/00362 |
| 2018/0276495 | A1* | 9/2018 | Yu | G06K 9/6215 |
| 2018/0293981 | A1* | 10/2018 | Ni | G10L 15/22 |

OTHER PUBLICATIONS

"Adding your bot to the Cortana channel", https://docs.microsoft.com/en-us/cortana/tutorials/bot-skills/add-bot-to-cortana-channel, Published on: Apr. 15, 2017, 10 pages.

Mangiavacchi, Jacopo, "Next Gen Skill / Bot Frameworks", https://medium.com/@JMangia/next-gen-skill-bot-frameworks-ab933a709f93, Published on: Mar. 10, 2017, 9 pages.

Stormacq, Sebastien, "Alexa Account Linking: 5 Steps to Seamlessly Link Your Alexa Skill with Login with Amazon", https://developer.amazon.com/blogs/post/Tx3CX1ETRZZ2NPC/Alexa-Account-Linking-5-Steps-to-Seamlessly-Link-Your-Alexa-Skill-with-Login-wit, Published on: Aug. 3, 2016, 22 pages.

Facemire, Michael, "Google's Next Play: Your Assistant for Everything—Not Just Answers", http://blogs.forrester.com/michael_facemire/16-10-14-googles_next_play_your_assistant_for_everything_not_just_answers, Published on: Oct. 14, 2016, 4 pages.

Gadiyar, Anitha Rao, "The Chatbot Imperative: Intelligence, Personalization and Utilitarian Design", https://www.cognizant.com/whitepapers/the-chatbot-imperative-intelligence-personalization-and-utilitarian-design-codex2469.pdf, Published on: Jan. 2017, 1-12 pages.

"International Search Report and Written Opinion Issued in PCT Application No. PCT/US18/028715", dated Jun. 15, 2018, 13 Pages.

Wobcke W, et al., "A BDI Agent Architecture for Dialogue Modelling and Coordination in a Smart Personal Assistant", In Proceedings of the NICTA-HCSNet Multimodal User Interaction Workshop, vol. 57, Sep. 19, 2005, 78 Pages.

\* cited by examiner

PERSONALIZATION OF VIRTUAL ASSISTANT SKILLS BASED ON USER PROFILE INFORMATION

PRIORITY

This patent application claims the benefit of U.S. Provisional Patent Application 62/503,590, filed May 9, 2017, which is incorporated by reference herein in its entirety.

BACKGROUND

Personal assistant services have become increasingly sophisticated through the development of complex data management techniques that expose a variety of knowledge and capabilities. As a result, personal assistant services are being integrated into a variety of online communication platforms used by human users such as web pages, software apps, and personal electronic devices. Interfaces to personal assistant services include bots and other interactive agents that facilitate voice or text chats through real-time transmission of communications (e.g., text, photos, videos, voice snippets).

Such bots and agents may provide access to an information service, to a single or multiple users, through a variety of network-accessible computing devices. Current forms of personal assistant services also have been integrated into the features of network-based communication sessions such as chats, email, voice calls, and the like, including in person-to-person and person-to-business interactions. Accordingly, personal assistant services are increasingly used to provide information to humans and computing systems in a variety of private, commercial, and social settings. However, such information and interactions may involve complex representations and programming, while silos of data and capabilities are often separated among different bots and agents.

SUMMARY

Various details for the embodiments of the inventive subject matter are provided in the accompanying drawings and in the detailed description text below. It will be understood that the following section provides summarized examples of some of these embodiments.

Embodiments described herein generally relate to data and information managed within a personal assistant service, and in particular, to techniques and configurations that provide access to personalized data and inferences from a user profile and contextual information data set within a personal assistant service. Example embodiments discussed herein further relate to accessing, managing, updating, and interfacing with user profile and contextual information available from a personal assistant service, through the use of bots, agents, skills, or interfaces of a personal assistant service or of a third-party information service. Further example embodiments relate to techniques and system configurations for configuring, implementing, and using these personal assistant service features.

An embodiment discussed herein includes operations executed with a processor and memory of a computing system, to enable personalization of a third-party in connection with a personal assistant service, with operations including: implementing a data interface of the personal assistant service, the data interface to expose user data maintained by the personal assistant service to the third-party skill based on a set of privacy settings and a set of permission settings; receiving a request from the third-party skill, via the data interface, to obtain the user data for a human user in connection with an action of the third-party skill; and providing the user data to the third-party skill in response to the request, via the data interface, based on the privacy settings applicable to access of the user data by the third-party skill, and based on the permission settings applicable to use of the user data with performance of the action by the third-party skill.

In further examples, the operations may include: defining the privacy settings applicable to subsequent access of the user data by the third-party skill, and defining the permission settings applicable to subsequent use of the user data for performance of the action by the third-party skill; receiving, from the third-party skill, an indication of one or more permissions and data values used by the third-party skill in performance of the action, where the permissions and data values relate to one or more required items to perform the action of the third-party skill or one or more optional items to perform a feature of the action of the third-party skill; and presenting a request, to the human user, to establish the permissions and privacy settings related to the action of the third-party skill, in response to the indication of the permissions and data values used by the third-party skill to perform the action.

Also in further examples, the user data may include user profile data or user contextual information (or both), where the user profile data and the user contextual information is provided from among: status data corresponding to a status of the human user or a user device that is monitored by the personal assistant service, defined data expressly defined by the human user in the personal assistant service, or inferred data that is determined for the human user by the personal assistant service.

Also further examples, the third-party skill is one of: an automated bot agent operated within a user interface of the personal assistance service; an automated bot agent operated within a user device; or an automated bot agent operated by a third-party skill service independently of the personal assistant service.

Also in further examples, the user data is provided to the third-party skill in connection with one of: a user-invoked push data model that provides the user data from the personal assistant service to the third-party skill in response to user invocation of the third-party skill; a skill-invoked pull data model that obtains the user data from the personal assistant service in response to a condition for the action, the condition being determined by the third-party skill; or an event-invoked data model, that provides the user data from the personal assistant service to the third-party skill in response to detection of an event condition, the condition being determined by the personal assistant service.

Another embodiment discussed herein includes a computing device including processing hardware (e.g., a processor) and memory hardware (e.g., a storage device or volatile memory) including instructions embodied thereon, such that the instructions, which when executed by the processing hardware, cause the computing device to implement, perform, or coordinate the electronic operations for these techniques and system configurations. Another embodiment discussed herein includes a computer program product, such as may be embodied by a machine-readable medium or other storage device, which provides the instructions to implement, perform, or coordinate the electronic operations for these techniques and system configurations. Another embodiment discussed herein includes a method operable on processing hardware of the computing device, to implement, perform, or coordinate the electronic operations for these techniques and system configurations.

As discussed herein, the logic, commands, or instructions that implement aspects of the electronic operations described above, may be provided in a local computing system or a remote computing system, including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below.

This summary section is provided to introduce aspects of the inventive subject matter in a simplified form, with further explanation of the inventive subject matter following in the text of the detailed description. This summary section is not intended to identify essential or required features of the claimed subject matter, and the particular combination and order of elements listed this summary section is not intended to provide limitation to the elements of the claimed subject matter.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

The following disclosure provides an overview of techniques and configurations to enable the communication of personalized user profile and contextual information within a personal assistant service and accompanying service features. As discussed herein, these techniques and configurations may be used to provide unique and personalized information to a third-party component (e.g., a third-party skill), that is integrated or operable with the personal assistant service, based on the personal assistant service's knowledge of the user and the user's status, the preferences and defined data values stored for the user, and inferences prepared for the user. As a non-limiting example, a third-party skill that is exposed in a chat bot for performing a custom action for the user may access personal assistant service data to obtain personalized user information such as a user's name, the location of the user, the user's schedule, and inferred information about the user (such as frequent locations of the user). The chat bot may customize its actions and interactions accordingly based on this user information. Additionally, as discussed herein, such user information provided by the personal assistant service may be controlled or modified based on user permissions and privacy settings, thus allowing a user full control of private or sensitive information to third parties.

A personal assistant service may include a variety of voice, text, or other communication interfaces, and may operate to collect a variety of location and context information of a user for personal customization of information and actions. Examples of personal assistant services may include MICROSOFT® Cortana, AMAZON® Alexa, GOOGLE® Assistant, APPLE® Siri, SAMSUNG® Bixby, among others, but it will be understood that the techniques discussed herein are not limited to any particular implementation of a personal assistant platform. Further, while the terminology used herein may relate to specific programming techniques and interfaces provided by the MICROSOFT® Cortana personal assistant service, it will be understood that similar programming techniques and interfaces might be incorporated by other services and companies (including third-party companies that integrate or customize other features of such personal assistant services).

Personal assistant services may use skills or similar capabilities functions to complete tasks and perform certain actions with the personal assistant service. A brief example of a skill might include a restaurant interaction skill, allowing a user to issue a command, such as "Reserve me a table at Mario's Italian Restaurant", or "Order me a Coffee from Fourth Coffee Company". In an example, a "third-party" skill refers to a skill that is imported or integrated into the personal assistant service from another source, such as another developer or service (although a third-party skill may include skill features directly developed for the personal assistant service by the same developer or company). As a further example, a third-party skill might leverage a different chat bot and external data source on behalf of another entity (e.g., an external chat bot hosted by a restaurant reservation service) in order to accomplish the skill action within the personal assistant service.

In further examples, a personal assistant service may be used to proactively suggest a skill to users at the right moment based on context (e.g., ordering food for a regular lunch meeting, or turning on the lights when they get home). Further to the techniques discussed herein, a personal assistant service may be configured to broker connections between users and bots exposed from the skills, including third-party bots, so that users can easily and naturally discover and interact with an appropriate bot at the right time and in the right context.

In any of the scenarios discussed herein, a personal assistant service may integrate the use of natural language processing of voice or text conversations, to interpret queries and commands from humans in an intelligent way to perform an appropriate action. Thus, the techniques discussed herein may be applicable to a variety of configurations and forms of a personal assistant service. Further, some references to the skills and service interfaces discussed herein are examples of text-based bots, but it will be understood that other forms of bots and automated or semi-automated agents (such as voice or graphical-based agents) may also be used.

Figure 1:
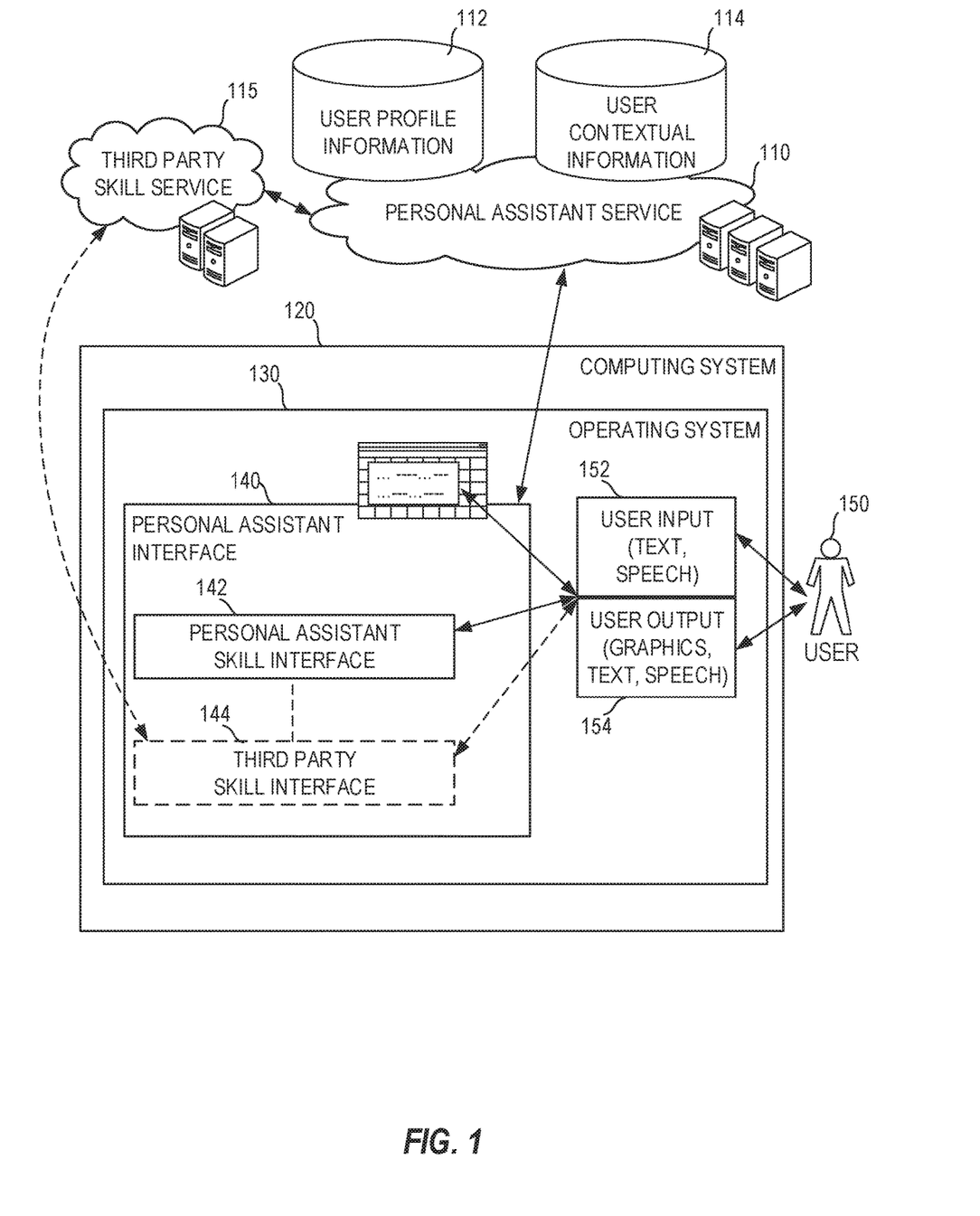
FIG. 1 illustrates an overview of a system configured to implement a personalized third-party skill service and third-party skill interface to a personal assistant service, according to an example described herein.

FIG. 1 illustrates an overview of an example system configuration to implement a personalized third-party skill service and third-party skill interface to a personal assistant service 110. As shown, a user 150 operates a computing system 120 (e.g., a personal computer, tablet, smartphone, etc.), with use of an operating system 130 that executes a personal assistance interface 140. In an example, the personal assistance interface 140 is integrated into features of the operating system 130; in another example, the personal assistance interface 140 operates as a standalone software application, or is invoked by another software application (such as a browser) within the operating system 130. The personal assistance interface 140 may operate through a combination of local processing (on the computing system 120) and remote processing (on a personal assistant service), although various features of the personal assistant interface may operate with exclusively local or remote processing. In some examples, interactive elements of the personal assistant interface 140 such as a voice (e.g., human speech) interface may be exposed through hardware devices of the computing system 120 (e.g., a microphone and speaker), or a dedicated hardware device (e.g., a network-connected speaker and microphone standalone unit).

The user 150 may interact with the personal assistance interface 140 by providing user input 152 to the computing system 120 in forms such as text or speech, and the personal assistance interface 140 provides user output 154 to the computing system 120 in forms such as graphics, text, or speech. Various software and hardware features to facilitate the user input 152 and the user output 154 (e.g., a microphone, keyboard, speaker, text processing, speech processing) are not depicted for simplicity, but may be integrated in the computing system 120 and the operating system 130 or in a network-connected system (e.g., being offloaded to a network-accessible cloud service). In certain examples, the computing system is embodied by a personal computer (e.g., desktop, notebook), a tablet, or a smartphone; in other examples, the computing system is embodied by a standalone device (e.g., a smart speaker/microphone device) with processing circuitry and various input and output devices.

The overview of FIG. 1 illustrates the presentation of a skill interface, a personal assistant skill interface 142, integrated into the personal assistant interface 140. The overview of FIG. 1 further illustrates an optional example depicting the integration of a third-party skill interface 144 into the personal assistant interface 140. In an example, the personal assistant skill interface 142 is an interface to a skill that is directly provided (e.g., designed, hosted, or operated) by the personal assistant service 110 (e.g., is a default skill or is operated by the same entity as the personal assistant service), whereas the third-party skill interface 144 is a skill operating on the computing system 120 which is provided (e.g., designed, hosted, or operated) by another service or entity has permission to operate and function on behalf of the user.

In another example, the personal assistant service 110 is connected via a network to a third-party skill service 115. In this scenario, the third-party skill service 115 invokes and provides operations of the third-party skill at a remote location (e.g., in the cloud, and remote from the computing system 120). For instance, the personal assistant service 110 may invoke and pass along user data to the third-party skill service 115, with the personal assistant service 110 serving as an intermediary between a client-side interface (the personal assistant interface 140) and the third-party skill service 115.

In yet another optional example, the third-party skill interface 144 is embodied by a client software application, executing in the operating system 130 of the computing system 120. In this scenario, the third-party skill interface directly communicates with the third-party skill service 115. In summary, the third-party skill may be provided (and operate) inside or outside of the personal assistant interface 140, and the third-party skill interface 144 may directly or indirectly access the third-party skill service 115. This software application may operate within the personal assistant interface 140 (as depicted) or separately from the personal assistant interface (not depicted).

In some examples, the third-party skill is provided to and used by the user 150 in the same manner as a personal assistant service skill (e.g., a native or built-in skill directly developed for the personal assistant service 110 by the same developer or company as the personal assistant service 110). Thus, the user 150 may operate and interact with the same interface (e.g., a voice interface) without knowing whether a third-party or native skill is being utilized.

Skills that are provided by the personal assistant interface 140 can provide a personalized experience to end users by leveraging user profile information 112 and user contextual information 114 available to the personal assistant service 110. For example, the user profile information 112 and the user contextual information 114 that is collected by the personal assistant service 110 may be provided in various forms such as: user preferences, inferred habits and activity information, user dynamic contextual information, contextual inferences, and the like. In accordance with the techniques discussed herein, the operation of the third-party skill service 115 or the third-party skill interface 144 can utilize this user profile information 112 and user contextual information 114 to provide personalized and customized interactions via the personal assistant service 110 or via the third-party skill service 115.

In an example, user profile information 112 relates to a data set or data types that the personal assistant service 110 maintains about the user 150 (or the user's computing device). In a further example, this user profile information 112 may be accessible and editable, at least in part, by the user 150, and presented in a "Notebook" of user profile information values. Various forms of a third-party skill (e.g., a third-party skill operating via the third-party skill service 115, or operating via the third-party skills interface 144) may leverage this data when the user profile information 112 is available, and when a controlling user (e.g., user 150) has provided consent (e.g., implicit or explicit permissions) for sharing this information for use with the third-party skill.

In an example, user contextual information 114 relates to a data set or data types that the personal assistant service 110 maintains about the user, but that is contextual in nature and is likely to change more frequently. Such data may include user data inferences and dynamically monitored or predicted values (e.g., current location, expected next location, most frequently visited places, and the like). In a further example, this user contextual information 114 is not editable or directly accessible to an end user, although the Notebook of user profile information values may be used to provide feedback or to change permissions on available uses of such data. Various forms of a third-party skill (e.g., operating via the third-party skill service 115 or operating via the third-party skills interface 144) may also leverage this data when the user contextual information 114 is available, and when a controlling user (e.g., user 150) has provided consent (e.g., implicit or explicit permissions) for utilizing the types of contextual information with the third-party skill.

As will be understood, both user profile information 112 and user contextual information 114 are used by skills of the personal assistant service 110 (e.g., provided via the personal assistant skill interface 142) and the third-party skill service 115 (e.g., the third-party skill interface 144), although the availability for such information may be modified according to privacy and permissions settings. Permissions for accessing such information may be based on opt-in or user-authorized forms of data collection, including data collection or data user settings that may be established at sign up, established during use, or changed at any time by the user. However, in some cases, the types of data available to a personal assistant service skill (e.g., a native or built-in skill exposed via the personal assistant skill interface 142) may include a larger set of data than that available to a third-party skill (e.g., exposed via the third-party skill interface 144 or the third-party skill service 115). Further, permissions and settings may be established by a user in a first computing device, and this first computing device may differ from the second computing device that invokes or operates the third-party skill.

Additionally, although a third-party skill might request user profile information 112 and user contextual information 114 as part of a skill registration process (e.g., when being authorized or integrated into the personal assistant service 110 or a personal assistant interface 140), such requests do not guarantee that the data is available for a specific user. In a further example, if data is not available or authorized for a specific user, the personal assistant service 110 may provide a blank value (e.g., an empty string or null). In other examples, if data is not available or authorized for a specific user, the personal assistant service 110 may provide various forms of error messages or modified data. Such modified data may include the removal or redaction of personally identifying data, or the production of anonymized data (e.g., providing location information based on a city geographic area rather than location information based on a precise street location, building, or global positioning system (GPS) coordinates).

Figure 2:
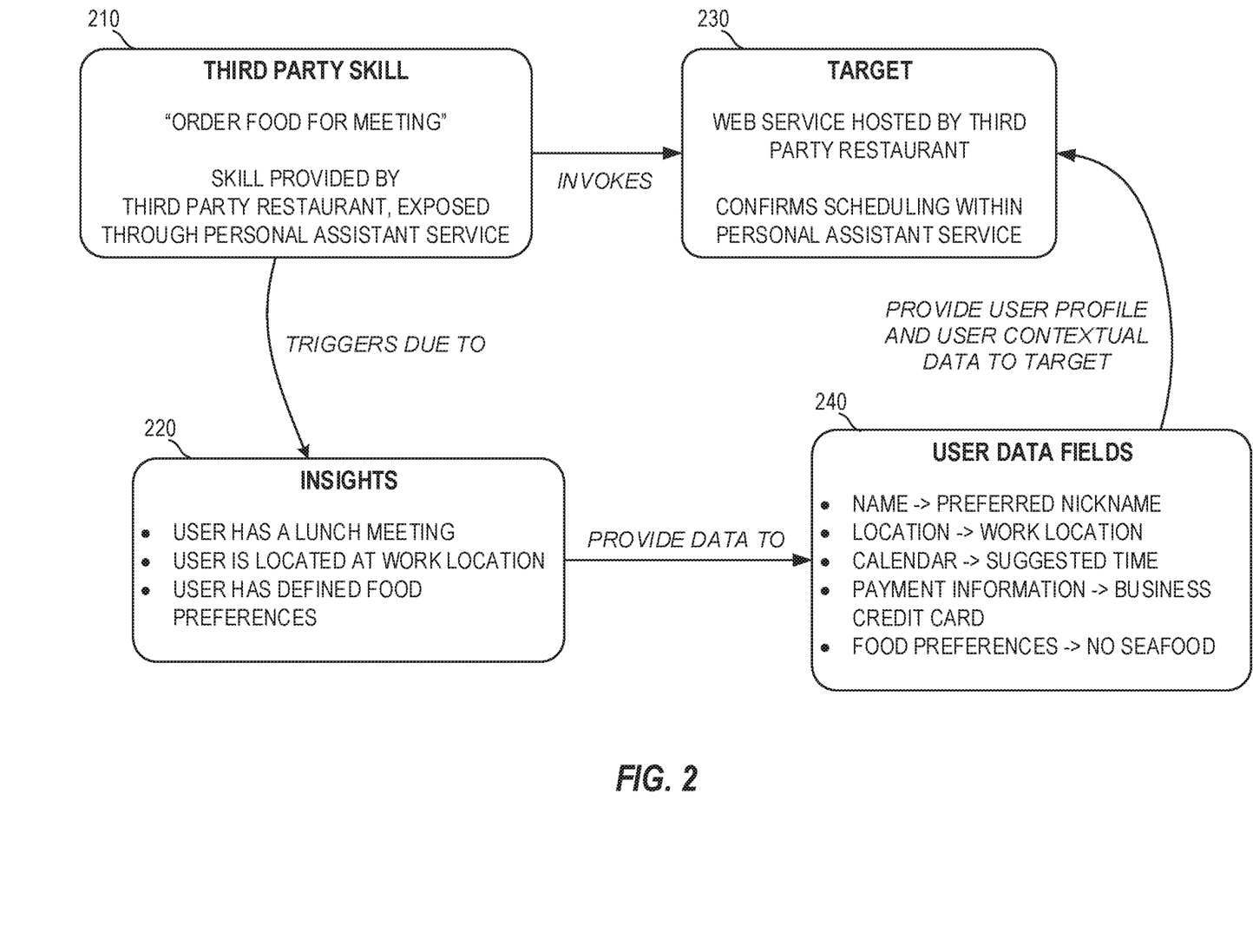
FIG. 2 illustrates data relationships for a third-party skill implementation of a personal assistant service, according to an example described herein.

FIG. 2 illustrates data relationships for an example third-party skill implementation of a personal assistant service, according to an example described herein. As shown, a third-party skill 210 is designed for operation in connection with a personal assistance service, and relates to a specific task. In the third-party skill 210 illustrated in FIG. 2, this skill is an automated bot to place an order with a business (specifically, a restaurant), with this skill being provided by or on behalf of the third-party restaurant and exposed through an interface of the personal assistance service (e.g., a text or voice chat session). Consistent with the examples described above with reference to FIG. 1, the third-party skill may operate as part of a third-party skill service that is accessed via a network connection with a personal assistant service, or a third-party skill service that is accessed via a direct connection with a user interface on a client computing machine.

As an example, the third-party skill 210 may be triggered on behalf of an express request received from a user to "Order Food for Meeting from Mario's Italian Restaurant"; as another example, the third-party skill 210 may be triggered as a result of a suggestion from the personal assistance service, which has a set of insights 220 related to, for instance, the user's calendar (e.g., that the user has a lunch meeting with 5 other persons), the user's defined food preferences (e.g., to prefer Italian food from restaurants located within five minutes of the work location), and the like. These insights 220 may be determined from one or multiple of contextual data fields (e.g., in user contextual information). Further, the triggering of the third-party skill 210 from the insights may be caused as a result of on a push-, pull-, or event-driven data model, discussed further below.

In addition to the insights 220, the personal assistance service maintains a number of user data fields (e.g., in user profile information) relating to the user. These may include information related to, for instance, the user's name (in the form of a preferred nickname), the user's current location (in the form of an identification that the user is located at a primary workplace), the user's calendar information (in the form of a suggested time for lunch and the lunch meeting), payment information (in the form of a business credit card, associated with business expenses at the workplace), and food preferences (in the form of preferences or prohibitions, such as no seafood).

The insights 220 and user data fields 240 collected by the personal assistance service may include information that is otherwise not known by the third-party restaurant. In an example where permissions to collect and access such insights 220 and user data fields 240 have been approved for the third-party skill 210, the third-party skill 210 can invoke a target service 230 to receive and utilize data from the insights 220 and user data fields 240 via the personal assistance service. For example, the target service 230 may be a web service hosted by the third-party restaurant, which receives restaurant orders; the web service may receive the relevant name, location, calendar, payment information, and food preference information to auto-populate information used for fulfilling the order.

Additionally, the interactive session launched by the third-party skill 210 may utilize numerous features of the insights 220 and user data fields 240, such as to provide a personalized interaction (e.g., to call the user by his or her preferred nickname), to suggest a correct location (e.g., to prevent delivery at an incorrect location, or to identify when the user is not or is predicted to not be located at the intended location), to access calendar details (e.g., to schedule delivery of the food to arrive prior to the meeting), to access payment information (e.g., to suggest use of the business credit card, due to the location of the lunch and the meeting participants), and to access food preferences (e.g., to prevent the user from ordering an unintended food item). In this fashion, user data fields 240 may be automatically determined and provided to third-party skill 210 and the target service 230; this may increase accuracy, reduce the amount of human interaction, and shorten the amount of time to perform a transaction.

It will be understood that the abilities of the third-party skill may vary in complexity and may be customized significantly based on the types of insights 220 and user data fields 240 collected and accessible via permissions. It will be understood that the provision of the aforementioned user information may provide the opportunity for personalization and accompanying technical benefits in a variety of forms, including shorter communication sessions with users, more precise actions in the systems, less custom programming and logic, and the like.

The use of user profile and user contextual information by a third-party skill may be invoked in connection with various data delivery models, consistent with the examples described herein. In various examples, the invocation and use of user profile and user contextual data in a third-party skill may occur according to one of the following approaches.

User-Invoked Push Data Model.

In this example, a third-party skill declares and registers a set of user understanding elements that the third-party skill expects to use as part of the skill operations. As an example, a restaurant ordering skill might register to access "Frequent Places" and "Cuisine Type Preferences" data associated with a user. In this scenario, when the user invokes the skill (after being authorized to receive the data), data values associated with these registered data elements are provided to the skill. Also, with the user-invoked push data model, a user can register to provide permission sets to access some but not all types of the data values used by the skill; for instance, a user could choose to share cuisine type preferences, but not frequent places, with a restaurant skill. In the scenario that the user does provides consent for the skill to access the data type, then no further authorization is needed (although the user may be provided with a mechanism to revoke authorization). For example, a Notebook of available user data fields may provide an indication of available push data fields available for use by registered and authorized third-party skills; the Notebook may provide the ability for a user to withdraw, change, or add consent to access certain data types from a third-party skill.

In use of the user-invoked push data model, the personal assistant service operates to "push" specific user profile and user contextual information data fields, when the third-party skill is invoked. Thus, in this data model, the personal assistant service is provided with full control over user data to provide data from the various user profile and contextual information to an external location, based on user permissions. Such user permissions may be applied for various forms of "optional" and "required" (or "mandatory") data fields needed for the skill to operate.

Skill-Invoked Pull Data Model.

In this example, a third-party skill may be provided with permission to access the personal assistant service and obtain certain user profile or user contextual data fields. As a brief example, a third-party skill operable to request on-demand transportation for a user may be provided with the ability to pull location information of the user at a predetermined time. Thus, in the example where the user has requested the on-demand transportation service provide a transportation at a predetermined scheduled time (e.g., tomorrow at 9:00 AM), the third-party skill may query the personal assistant service near the predetermined schedule time (e.g., at 8:45 AM) to obtain the current location of the user, and automatically determine where to send the transportation service. In further examples, the third-party skill may operate with sophisticated actions that ask the personal assistant service for certain user data values at runtime, such as based on semantic understanding or an action being requested by the user (e.g., asking for detailed user information on the user's cuisine preferences once the user decides to order food from a menu). In this fashion, a skill-invoked data model may consider the semantics of currently available information and the specific user action being performed.

In the use of the skill-invoked data model, the third-party skill initiates a data query to the personal assistant service in order to accomplish a certain action. A permission for the third-party skill to obtain the user profile or user contextual data may be limited based on some defined condition, such as until a specific request (e.g., a transportation pickup) is fulfilled; in other examples the permission for the skill to obtain certain user profile or user contextual data fields may have a defined expiration time or date. Further permissions may be separated by both optional and required (or mandatory) data fields used by the third-party skill.

Event-Invoked Data Model.

In this example, the personal assistant service can trigger or change the operation of a third-party skill based on various user profile or user contextual data fields being detected by the personal assistant service. In other words, the personal assistant service may operate to inform the third-party skill when to wake up and what action to perform, based on some detected change. As a brief example, this model may invoke a third-party skill (e.g., a food ordering app) when a user leaves a frequent location (e.g., work). In this example, the third-party skill does not need to manually process the user's location data to determine when the user leaves the frequent location or is approaching another frequent location; rather, the third-party skill may be automatically invoked by the personal assistant service at an appropriate time, and provided with the relevant information from the personal assistant service.

In the use of the event-invoked data model, the third-party skill registers with the personal assistant service, to subscribe to certain types of information (e.g. user location information) and to indicate the types of events, conditions, or data value changes that trigger an event and an action within the third-party skill. Consistent with the techniques discussed herein, granular permissions may be modified to provide permissions for the third-party skill to respond to certain events, and also to provide permissions to inferences and user data fields that are associated with the events.

Figure 3:
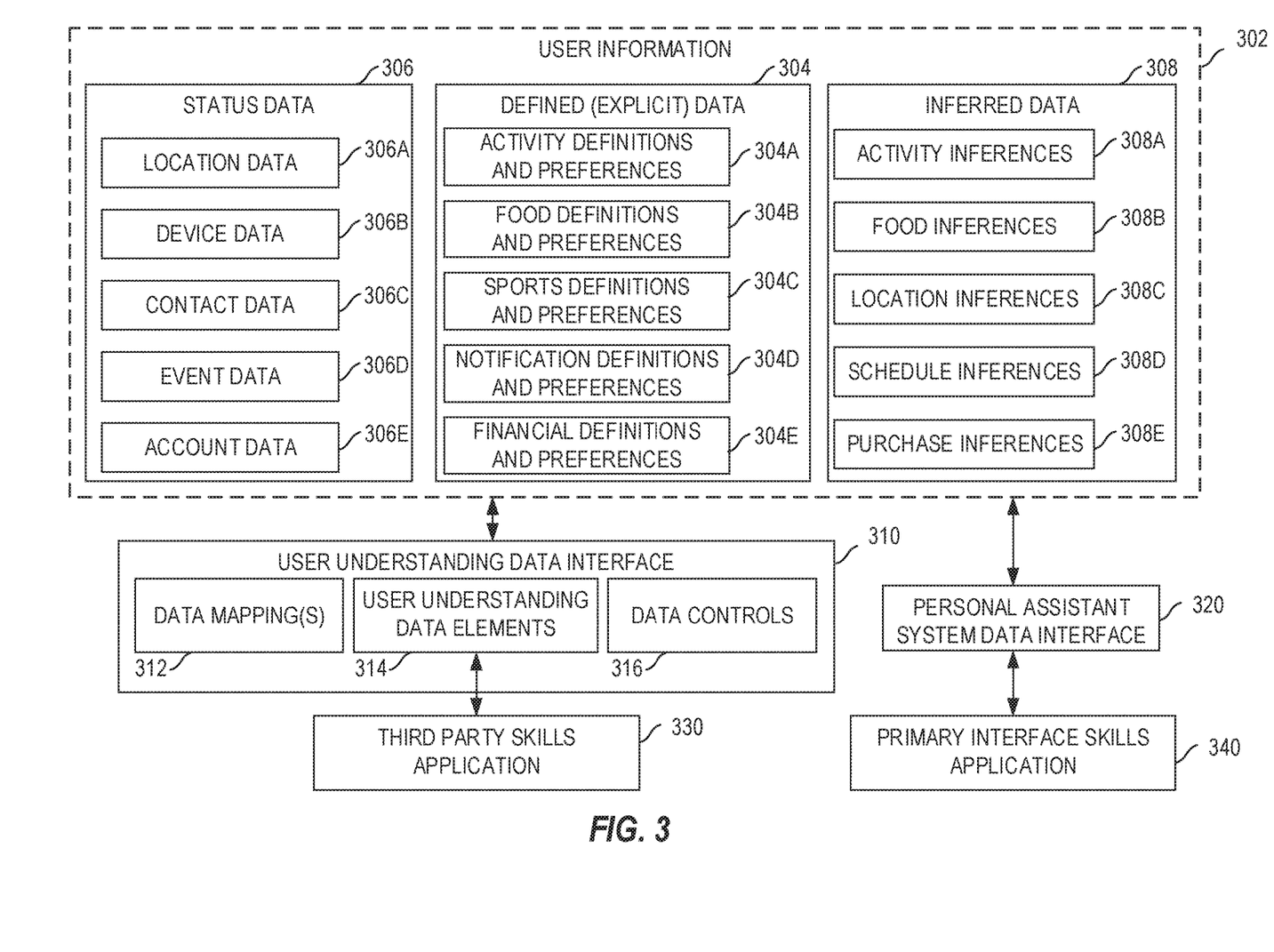
FIG. 3 illustrates data objects and interfaces of a personal assistant service accessible by a third-party skills application, according to an example described herein.

FIG. 3 illustrates data objects and interfaces of a personal assistant service accessible by a third-party skills application, according to an example described herein. As shown, a collection of user information 302 is accessible by a third-party skills application 330 via a user understanding data interface 310. This user information 302 may include aspects of the previously mentioned user profile information and user contextual information, but is presented to via the user understanding data interface 310 as a unified set of user information 302 providing defined data 304, status data 306, and inferred data 308. It will be understood that the user information 302 may be collected from among multiple data sources of a personal assistant service, and that the identified categories and types of information may differ depending on system implementation. Further, varying types of these data fields may be exposed via the user understanding data interface 310 depending on the data model (push, pull, event-driven) involved with the third-party skills application 330 (and any accompanying third-party skill or skill service).

As shown, the user understanding data interface 310 provides the third-party skills application 330 with user understanding data elements 314, according to defined data mappings 312 (e.g., which data fields are provided from the personal assistant system to be accessible by the third-party skills application 330) and data controls 316 (e.g., which data fields that the user has provided permission for the third-party skills application 330 to access). In contrast, a skills application that is provided and hosted from the personal assistant system, such as the primary interface skills application 340, may access the user information 302 directly from a personal assistant system data interface 320 without the data mapping or data controls applicable to the third-party skills application.

In a specific example, data controls 316 are continually enforced (e.g., verified) to prevent access to unauthorized user data or the performance of unauthorized actions by the third-party skills application 330. The data controls 316 may include mandatory settings (settings that must be enabled in order for the skill to operate) and optional settings (settings that may be enabled in order for some functionality or feature of the skill to operate). The data controls 316 may also include controls regarding: the amount of time that the third-party skills application 330 is provided with certain data fields; controls on the accuracy of information (e.g., how granular, detailed, or precise certain location information may be); and the use or distribution of data (which may relate to one of multiple predefined privacy levels). Thus, any number of privacy and permission controls for the third-party skills application 330 may be implemented via the data controls 316.

As a non-limiting example, the defined data 304 may be established (e.g., expressly or explicitly defined by a user) from user preferences such as: activity definitions and preferences 304A, food definitions and preferences 304B, sports definitions and preferences 304C, notification definitions and preferences 304D, and financial definitions and preferences 304E.

Also as a non-limiting example, the status data 306 may be established from data fields such as: location data 306A, device data 306B, contact data 306C, event data 306D, account data 306E.

Also as a non-limiting example, the inferred data 308 may include: activity inferences 308A, food inferences 308B, location inferences 308C, schedule inferences 308D, or purchase inferences 308E.

Other forms of contextual data (not depicted) that may be provided via the user information 302 may include contextual information such as: schedule information indicating a time to leave; schedule information indicating reminders; scheduling information indicating commitments; travel arrangements and travel schedules; commute patterns and schedules; meeting schedules and scheduling conflicts; among others. This type of contextual information may be surfaced to the third-party skills application to provide a customized and personalized approach, controlled via the surfaced data mappings 312 and the data controls 316.

Data values from any of the data fields in data sources 304, 306, 308 may determine the type of content available in the third-party skills application 330. Further, the data values from any of the data fields may determine or affect the type of actions that the third-party skills application 330 can take, the type of suggestions offered by the third-party skills application 330, or the like. Also further, the type and complexity of the data mappings 312 and the type and complexity of the data controls 316 may also affect the operation of the third-party skills application 330.

As a specific implementation example, user information and accompanying user understanding data elements may be provided in the following object-based user understanding element data fields:

TABLE 1

| Entity Name | Description |
| --- | --- |
| User.SemanticLocation.Away | An Away object indicating if the user is currently away from their usual home or work location, usually indicating the user is travelling. |
| User.Preference.Dining.Cuisine | An array of string of the user's cuisine preferences. Example: ["Bar & grill", "Barbecue", "Diner"] |

TABLE 1-continued

| Entity Name | Description |
| --- | --- |
| User.SemanticLocation.Current | A Visit object representing the place the user is currently at. |
| User.SemanticLocation.FrequentPlaces | An array of Hub objects representing the places the user frequents, as stored in the Notebook under Frequent Places. |
| User.Info.Name | A Name object representing the user's name. |
| User.Info.Email | A string representing the user's email address. Example: "user@example.com" |

Similar device and location fields such as time zone, device information, and the like may also be provided in other user understanding element data fields.

In further examples, aspects of the user information may be implemented into JavaScript Object Notation (JSON) objects representing various activity, location, or status information for a user or a set of users.

In an example, user information may be provided in a "Hub" object. A Hub object may include the following properties:

TABLE 2

| Property | Type | Always included | Description |
| --- | --- | --- | --- |
| Id | string | No | A unique identifier for the hub. |
| Type | string | Yes | A description of the hub type. Currently only supported hub types are Home, Work and Other. |
| Name | string | No | A friendly name (usually user provided) of the hub. |
| Latitude | double | Yes | The latitude of the hub. |
| Longitude | double | Yes | The longitude of the hub. |
| Address | string | No | A localized string representing the address of the hub. |

As an example, JSON data value for a Hub object can be represented as:

```
{
    "Id":"11111111-1111-1111-1111-111111111111",
    "Type": "Work",
    "Name": "My office",
    "Latitude": 47.61512,
    "Longitude": -122.1957,
    "Address": "500 108th Ave NE, Bellevue, WA 98004, USA"
}
```

In an example, user information may be provided in a Visit object. A Visit object may include the following properties:

TABLE 3

| Property | Type | Always included | Description |
| --- | --- | --- | --- |
| StartTime | DateTime | Yes | The visit start date and time (in ISO-8601 date format). |
| EndTime | DateTime | No | The visit end date and time (in ISO-8601 date format). |
| Hub | Hub | Yes | Reference to the Hub object that represents this visit. |
| VenueName | string | No | A point of interest. The venue name. |

TABLE 3-continued

| Property | Type | Always included | Description |
| --- | --- | --- | --- |
| Away | boolean | No | An indication if this visit represents an away from home/work visit. |

As an example, JSON data value for a Visit object can be represented as:

```
{
    "Id":"99999999-9999-9999-9999-9999999999",
    "StartTime": 2017-04-25T18:02:30+00:00,
    "EndTime": 2017-04-27T7:35:00+00:00,
    "Hub": {
        "Id":"11111111-1111-1111-1111-11111111111",
        "Type": "Work",
        "Name": "My office",
        "Latitude": 47.61512,
        "Longitude": -122.1957,
        "Address": "500 108th Ave NE, Bellevue, WA 98004, USA"
    }
    "VenueName": null,
    "Away": false
}
```

In an example, user information may be provided in an "Away" object. An Away object may include the following properties.

TABLE 4

| Property | Type | Always included | Description |
| --- | --- | --- | --- |
| Away | boolean | Yes | A boolean indicating if the user is currently away from their usual home or work location, usually indicating the user is travelling. |
| Since | DateTime | No | The date and time (in ISO-8601 date format) when the user Away status has last changed. |

As an example, JSON data value for an Away object can be represented as, when user is not away:
{"Away": false}
As an example, JSON data value for an away object can be represented as, when user is away since Apr. 25, 2017 6:02 PM UTC:
{"Away": true, "Since": "2017-04-25T18:02:00+00:00"}
In an example, information may be provided in a "Name" object. A Name object may include the following properties.

TABLE 5

| Property | Type | Always included | Description |
| --- | --- | --- | --- |
| GivenName | string | No | The users first name. |
| FamilyName | string | No | The users last name. |

As an example, JSON data value for an Name object can be represented as:
{"GivenName": "John", "FamilyName": "Smith"}
In a further example, third-party skills may be designed as part of a Bot Framework, which provides a standardized interface to access and utilize skill bots. For Bot Framework based skills, the user information discussed herein may be communicated in an "entities" property of the request activity. Further integration with other types of standardized Bot Frameworks or intermediate bot and agent platforms may also be used in connection with the provision of user data to third-party skills as discussed herein.

Figure 4:
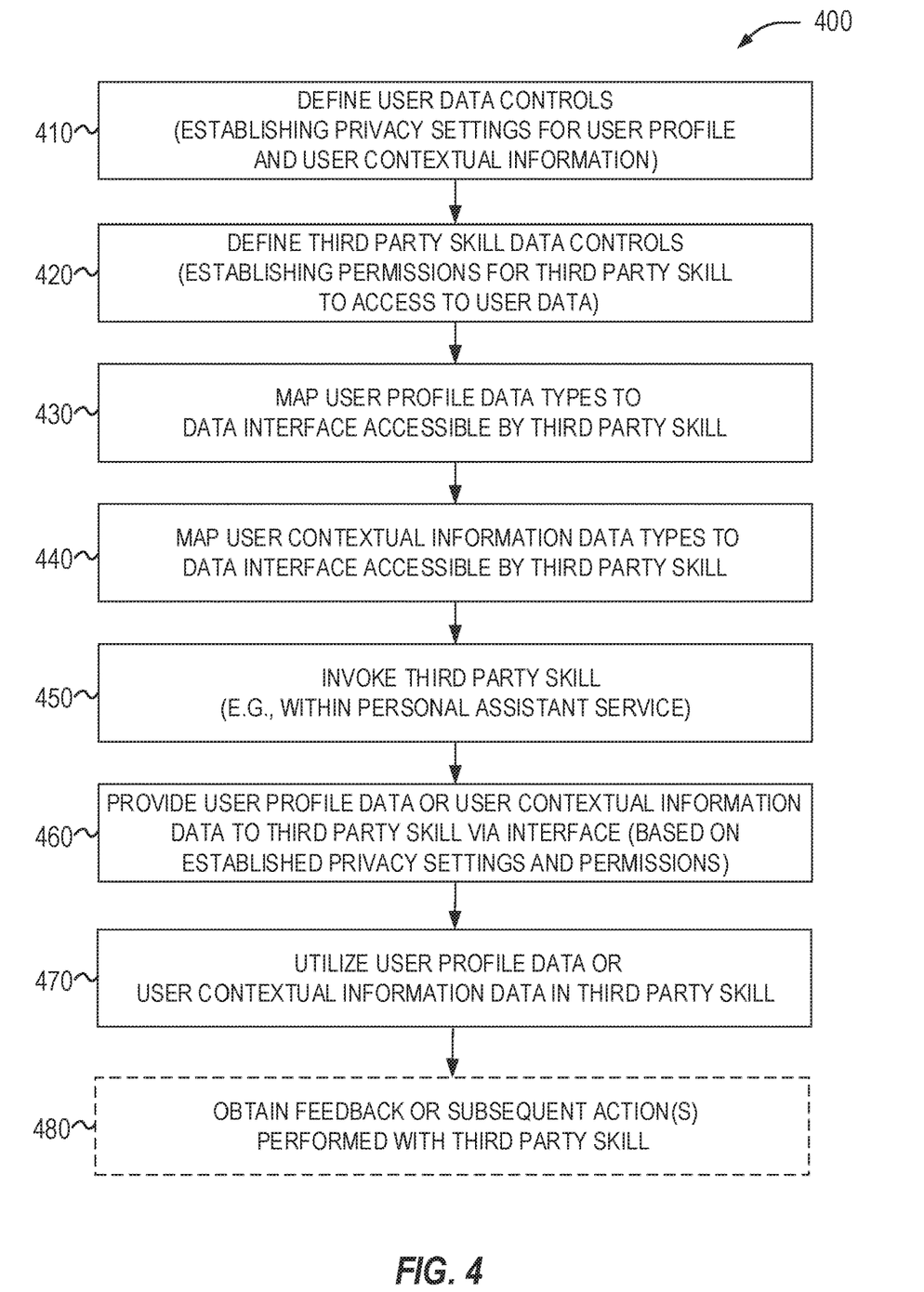
FIG. 4 illustrates a flowchart of an example set of operations for establishing and implementing personalized user data in a third-party skill for a personal assistant service, according to an example described herein.

FIG. 4 illustrates a flowchart of an example set of operations for establishing and implementing personalized user data in a third-party skill for a personal assistant service, according to an example described herein. It will be understood that the following operations may be implemented with additional or different steps and among the same or different actors, and that the following description is provided from the perspective of an example integration of a third-party skill operating within a personal assistant service interface.

As shown, the flowchart 400 includes operations performed within the operation of the personal assistant service for defining user data controls (operation 410) and defining third-party skill data controls (operation 420). For example, the user data controls may be provided in the form of privacy settings that define permissions or rights for a third-party skills application to access data fields or types of user profile information and user contextual information. Also for example, the third-party skill data controls may be provided in the form of permissions that expressly allow a third-party skill to do certain actions or access certain user data within the personal assistant service. In an example, these privacy settings and permission settings may be established or updated at the time that a third-party skill is installed, subscribed, enabled, or integrated into a personal assistant service.

The flowchart 400 continues with operations to map the user profile data types to an interface accessible by the third-party skill (operation 430) and map the user contextual information data types to the interface accessible by the third-party skill (operation 440). In an example, this interface is a user understanding data interface hosted by the personal assistant system; in a further example, this data interface provides access to the user data from operation of the third-party skills application within a computing device or an external system (such as third-party skills system that hosts a third-party bot agent). The mapping and definition of the user profile data types and the user contextual information data types is dependent on the privacy settings and other permissions or rights to perform actions or access data values or types of data values. Other system variations as described above with reference to FIGS. 1 and 2 may also apply.

The flowchart 400 continues with the invocation of the third-party skill (operation 450), such as may occur with the use of a chat bot session or transaction to a third-party service, such as hosted by the personal assistance service platform (e.g., user interface). In further examples, the third-party skill may be invoked by other interfaces or software applications outside the personal assistant service. In connection with the operation of the third-party skill (e.g., within a personal assistant service session or transaction), the personal assistance service provides requested user profile data or user contextual information to the third-party skill to the associated interface (operation 460). This information is provided according to the established privacy settings and other permissions or rights as discussed above. In further examples, the user data is provided to the third-party skill in connection with user-invoked push data model, a skill-invoked pull data model, or an event-invoked data model, as discussed above with reference to FIG. 2.

Finally, the third-party skill may utilize the provided user data (user profile data or user contextual information) in connection with the third-party skill (operation 470), including for purposes of customization, action prediction, smart suggestions, and the provision of user data to external data services. The personal assistant service may optionally utilize information from the third-party skill, such as feedback or data from one or more subsequent actions (operation 480). For instance, the personal assistant service may utilize feedback to determine that a task (e.g., a ride via the transportation service, and scheduled via a third-party skill) has been completed, canceled, or changed; the personal assistant service may then perform follow-up (subsequent) actions based on such feedback (e.g., transmit an invoice or credit to the user).

Although many of the previous examples provided reference to a third-party skills application, it will be understood that the interfaces to provide personalized data values may be exposed to other types of interaction services and entities. Accordingly, a vast number of data inferences and predicted data values for a user or group of users may be provided from a personal assistant platform. Thus, it will be understood that a variety of personalization and data usage examples may be facilitated through the interfaces and interactions described herein.

Figure 5:
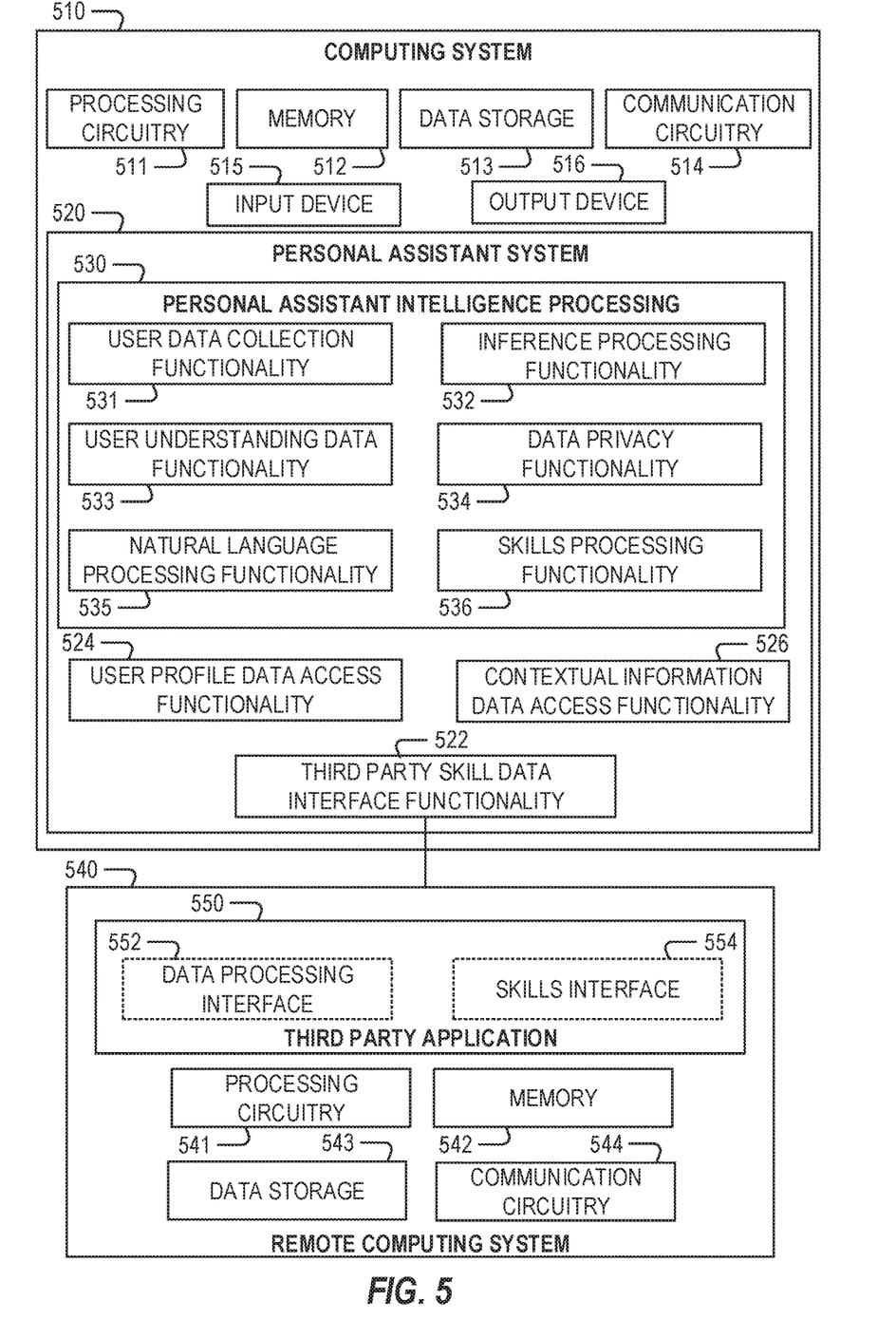
FIG. 5 illustrates a block diagram of hardware and functional components of a computing system to implement operations for implementing a third-party skill for a personal assistant service, according to an example.

FIG. 5 illustrates a block diagram of hardware and functional components of an example computing system configuration to implement operations for implementing a personalized third-party skills with a personal assistant service, according to an example. The example operations described above with reference FIGS. 1 to 4, for example may be performed at or among a local (e.g., client) or remote (e.g., server) computing device, and distributed component examples of the same. In an example, the software application (for the personal assistant system 520) is adapted to execute exclusively on a single computing device (e.g., computing system 510) with use of a processor and a memory device, with operation of respective processes as discussed herein. In a further example, the software application is adapted to execute some of the processes on a local computing device (e.g., computing system 510), with additional data and processing for the third-party skill being performed at a remote computing device (e.g., remote computing system 540).

FIG. 5 more specifically illustrates selected hardware and functional components of a computing system 510 and a remote computing system 540 to implement operations for personalization of skills within a personal assistant service. It will be understood, that although certain hardware and functional components are depicted in FIG. 5 and in other drawings as separate systems or services, the features of certain of the components may be integrated into a single service or subsystem. Further, although only one local computing system and one remote computing system is configured, it will be understood that the features of these systems may be distributed in some settings among one or multiple computing systems (including in cloud-based processing settings).

As shown, the computing system 510 includes processing circuitry 511 (e.g., a CPU) and a memory 512 (e.g., volatile or non-volatile memory) used to perform electronic operations (e.g., via instructions) for implementing personalization of personal assistant skills (e.g., to implement the techniques depicted and described for FIGS. 1-4), specifically with the execution of a personal assistant system 520; data storage 513 to store commands, instructions, and other data for operation and execution of the personal assistant system 520; communication circuitry 514 to communicate with an external network or devices (e.g., the remote computing system 540) via wired or wireless networking components for operation of the personal assistant system 520; an input device 515 (e.g., an alphanumeric, point-based, tactile, audio input device) to receive input (e.g., control commands) from a human user for the personal assistant system 520; and an output device 516 (e.g., visual, acoustic, haptic output device) to provide output (e.g., visual, acoustic, haptic output) to the human user from the personal assistant system 520.

In an example, the computing system 510 is adapted to execute software for the personal assistant system 520, through processing components or functionality (e.g., circuitry or software instructions), including personal assistant intelligence processing 530 in addition to user profile data access functionality 524, contextual information data access functionality 526, and third-party skill interface functionality 522. The functionality depicted in the personal assistant intelligence processing 530 includes: user data collection functionality 531, inference processing functionality 532, user understanding data functionality 533, data privacy functionality 534, natural language processing functionality 535, and skills processing functionality 536. In some examples, the software for the respective processing functionality may contact an external service (e.g., a cloud service) of the personal assistant platform to fully perform the processing functionality (e.g., to analyze natural language queries, or to store or obtain user data).

In a further example, the computing system 510 may receive inquiries from a third-party application 550 (e.g., that operates a third-party skill bot or a service for a third-party skill) of a remote computing system 540. These inquiries, for example, may include requests to access to personalization data via the third-party skill interface functionality 522. As shown, the remote computing system 540 includes processing circuitry 541 (e.g., a CPU) and a memory 542 (e.g., volatile or non-volatile memory) used to perform electronic operations (e.g., via instructions) for execution of the third-party application 550; data storage 543 to store commands, instructions, and other data for operation and use of the third-party application 550; and communication circuitry 544 to communicate with an external network or devices via wired or wireless networking components for communicating data. In an example, the third-party application 550 includes a data processing interface 552 and a skills interface 554 to implement features (and associated commands and actions) of a third-party skill. Other aspects may be performed by the remote computing system 540 to implement the techniques discussed herein.

As referenced above, the embodiments of the presently described electronic operations may be provided in machine or device (e.g., apparatus), method (e.g., process), or computer- or machine-readable medium (e.g., article of manufacture or apparatus) forms. For example, embodiments may be implemented as instructions stored on a machine-readable storage medium, which may be read and executed by a processor to perform the operations described herein. A machine-readable medium may include any non-transitory mechanism for storing information in a form readable by a machine (e.g., a computer). A machine-readable medium may include a single medium or multiple media (e.g., a centralized or distributed database, and/or associated caches and servers) that store the one or more instructions.

A machine-readable medium may include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. A machine-readable medium shall be understood to include, but not be limited to, solid-state memories, optical and magnetic media, and other forms of storage devices. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and optical disks. The instructions may further be transmitted or received over a communications network using a transmission medium (e.g., via a network interface device utilizing any one of a number of transfer protocols.

Although the present examples refer to various forms of cloud services and infrastructure service networks, it will be understood that may respective services, systems, and devices may be communicatively coupled via various types of communication networks. Examples of communication networks include a local area network (LAN), a wide area network (WAN), the Internet, mobile telephone networks, plain old telephone (POTS) networks, and wireless data networks (e.g., Wi-Fi, 2G/3G, and 4G LTE/LTE-A, or other personal area, local area, or wide area networks).

Embodiments used to facilitate and perform the electronic operations described herein may be implemented in one or a combination of hardware, firmware, and software. The functional units or capabilities described in this specification may have been referred to or labeled as components, processing functions, or modules, in order to more particularly emphasize their implementation independence. Such components may be embodied by any number of software or hardware forms. For example, a component or module may be implemented as a hardware circuit comprising custom circuitry or off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. The executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as the command and control service) may take place on a different processing system (e.g., in a computer in a cloud-hosted data center), than that in which the code is deployed (e.g., in a test computing environment). Similarly, operational data may be included within respective components or modules, and may be embodied in any suitable form and organized within any suitable type of data structure. The operational data may be collected as a single data set, or may be distributed over different locations including over different storage devices.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing system, comprising:
   a processor; and
   memory storing instructions that, when executed by the processor, cause the processor to perform acts comprising:
      implementing a data interface of a personal assistant service that exposes user data maintained by the personal assistant service to a third-party component based on a set of privacy settings and a set of permission settings, the set of privacy settings previously generated based upon interactions of a human user with the personal assistant service, wherein the user data includes user profile data and user contextual information, wherein the user contextual information includes inferred data that is determined for the human user by the personal assistant service, wherein the set of privacy settings defines portions of the user data that the third-party component is able to access, wherein the set of permission settings defines actions that the third-party component is able to perform with the user data after the user data has been accessed by the third-party component based upon the set of privacy settings;
      receiving a request from the third-party component, via the data interface, to obtain the user data for the human user in connection with an action that is to be performed by the third-party component;
      in response to the request and in response to detection of an event condition determined by the personal assistance service, identifying a portion of the user data based on the action that is to be performed by the third-party component, the set of privacy settings, and the set of permission settings; and
      providing, via the data interface, the portion of the user data to the third-party component in response to identifying the portion of the user data, wherein the third-party component performs the action in accordance with the set of permission settings.

2. The computing system of claim 1, the acts further comprising:
   receiving the set of privacy settings; and
   receiving the set of permission settings.

3. The computing system of claim 2, the acts further comprising:
   receiving, from the third-party component, an indication of a permission and a data value used by the third-party component in performance of the action, wherein the permission and the data value relate to at least one required item to perform the action of the third-party component or at least one optional item to perform a feature of the action of the third-party component; and
   presenting a request, to the human user, to establish the set of privacy settings and the set of permission settings related to the action of the third-party component, in response to receiving the indication of the permission and the data value used by the third-party component.

4. The computing system of claim 1, wherein the user profile data and the user contextual information is provided from among: status data corresponding to a status of the human user or a user device that is monitored by the personal assistant service, defined data expressly defined by the human user in the personal assistant service, or inferred data that is determined for the human user by the personal assistant service.

5. The computing system of claim 1, wherein the third-party component is an automated bot agent operated within a user interface of the personal assistance service, and wherein the automated bot agent includes an interface to receive text input or voice input from the human user.

6. The computing system of claim 1, wherein the third-party component is an automated bot agent operated within a user device, wherein the personal assistant service is a network-accessible service, and wherein the user device establishes a communication to the network-accessible service to obtain the user data via the data interface.

7. The computing system of claim 1, wherein the third-party component is an automated bot agent operated by a third-party component service independently of the personal assistant service, and wherein the user data is provided to the third-party component service from the personal assistant service via the data interface.

8. The computing system of claim 1, the acts further comprising:
causing the third-party component to be executed.

9. The computing system of claim 1, wherein the portion of the user data is provided to the third-party component in connection with one of:
a user-invoked push data model that provides the portion of the user data from the personal assistant service to the third-party component in response to user invocation of the third-party component;
a component-invoked pull data model that obtains the portion of the user data from the personal assistant service in response to a condition for the action, the condition being determined by the third-party component; or
an event-invoked data model, that provides the portion of the user data from the personal assistant service to the third-party component in response to detection of the event condition.

10. The computing system of claim 1, wherein the portion of the user data provided to the third-party component is modified based on the set of privacy settings, and wherein modifying the portion of the user data comprises removal, redaction, or anonymization of at least one data value of the user data.

11. A method executed by a processor of a computing system, the method comprising:
implementing a data interface of a personal assistant service to that exposes user data maintained by the personal assistant service to a third-party component based on a set of privacy settings and a set of permission settings, the set of privacy settings previously generated based upon interactions of a human user with the personal assistant service, wherein the user data includes user profile data and user contextual information, and wherein the user contextual information includes inferred data that is determined for the human user by the personal assistant service, wherein the set of privacy settings defines portions of the user data that the third-party component is able to access, wherein the set of permission settings defines actions that the third-party component is able to perform with the user data after the user data has been accessed by the third-party component based upon the set of privacy settings;
receiving a request from the third-party component, via the data interface, to obtain the user data for the human user in connection with an action that is to be performed by the third-party component;
in response to the request and in response to detection of an event condition determined by the personal assistance service, determining identifying a portion of the user data based on the action that is to be performed by the third-party component, the set of privacy settings, and the set of permission settings; and
providing, via the data interface, the portion of the user data to the third-party component in response to identifying the portion of the user data, wherein the third-party component performs the action in accordance with the set of permission settings.

12. The method of claim 11, further comprising:
defining the set of privacy settings;
defining the set of permission settings;
receiving, from the third-party component, an indication of a permission and a data value used by the third-party component in performance of the action, wherein the permission and the data value relates to at least one required item to perform the action of the third-party component or at least one optional item to perform a feature of the action of the third-party component; and
presenting a request, to the human user, to establish the set of privacy settings and the set of permission settings related to the action of the third-party component, in response to receiving the indication of the permission and the data value used by the third-party component.

13. The method of claim 11, wherein the user profile data and the user contextual information is provided from among: status data corresponding to a status of the human user or a user device that is monitored by the personal assistant service, defined data expressly defined by the human user in the personal assistant service, or inferred data that is determined for the human user by the personal assistant service.

14. The method of claim 11, wherein the third-party component is one of:
an automated bot agent operated within a user interface of the personal assistance service;
an automated bot agent operated within a user device; or
an automated bot agent operated by a third-party component service independently of the personal assistant service.

15. The method of claim 11, wherein the portion of the user data is provided to the third-party component in connection with one of:
a user-invoked push data model that provides the portion of the user data from the personal assistant service to the third-party component in response to user invocation of the third-party component;
a component-invoked pull data model that obtains the portion of the user data from the personal assistant service in response to a condition for the action, the condition being determined by the third-party component; or
an event-invoked data model, that provides the portion of the user data from the personal assistant service to the third-party component in response to detection of the event condition.

16. A hardware data storage device storing instructions that, when executed by a processor of a computing system, cause the processor to perform acts comprising:

obtaining, from a third-party component, an indication of a permission and a data value used by the third-party component in performance of an action, wherein the permission and the data value relate to at least one required item to perform the action of the third-party component or at least one optional item to perform a feature of the action of the third-party component;

generating a request, to present to a human user, to establish a set of privacy settings and a set of permission settings related to the action of the third-party component, in response to obtaining the indication of the permission and the data value used by the third-party component, establishing the set of privacy settings, the set of privacy settings are based upon interactions of the human user with a personal assistant service, the set of privacy settings define portions of user data of the human user that the third-party component is able to access, the user data comprising:

status data corresponding to a status of the human user or a user device that is monitored by the personal assistant service, defined data expressly defined by the human user in the personal assistant service, and inferred data that is determined for the human user by the personal assistant service;

establishing the set of permission settings, the set of permission settings define actions that the third-party component is able to perform with the user data after the user data has been accessed by the third-party component based upon the set of privacy settings;

accessing the set of privacy settings;

accessing the set of permission settings;

identifying a portion of the user data based on the action that is to be performed by the third-party component, the set of privacy settings, and the set of permission settings; and invoking the third-party component to perform the action and providing the portion of the user data to the third-party component using a data delivery model that defines how the portion of the user data is delivered to the third-party component.

17. The hardware data storage device of claim 16, wherein the data delivery model is a user-invoked push data model that provides the user data from the personal assistant service to the third-party component in response to user invocation of the third-party component.

18. The hardware data storage device of claim 16, wherein the data delivery model is a component-invoked pull data model that obtains the portion of the user data from the personal assistant service in response to a condition for the action, the condition being determined by the third-party component.

19. The hardware data storage device of claim 16, wherein the data delivery model is an event-invoked data model, that provides the portion of user data from the personal assistant service to the third-party component in response to detection of an event condition, the condition being determined by the personal assistant service.

20. The hardware data storage device of claim 16, wherein the third-party component is one of:

an automated bot agent operated within a user interface of the personal assistance service;

an automated bot agent operated within the user device; or an automated bot agent operated by a third-party component service independently of the personal assistant service.

* * * * *